US010109212B2

(12) United States Patent
Takada et al.

(10) Patent No.: US 10,109,212 B2
(45) Date of Patent: Oct. 23, 2018

(54) PROCESSING SYSTEM AND DISPLAY DEVICE

(71) Applicant: Toshiba Memory Corporation, Minato-ku, Tokyo (JP)

(72) Inventors: Marie Takada, Yokohama Kanagawa (JP); Yu Nakanishi, Yokohama Kanagawa (JP); Masanobu Shirakawa, Chigasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 252 days.

(21) Appl. No.: 15/068,517

(22) Filed: Mar. 11, 2016

(65) Prior Publication Data

US 2017/0053544 A1 Feb. 23, 2017

(30) Foreign Application Priority Data

Aug. 18, 2015 (JP) .................................. 2015-161361

(51) Int. Cl.
*G09B 5/12* (2006.01)
*G06F 17/30* (2006.01)
(52) U.S. Cl.
CPC ....... *G09B 5/125* (2013.01); *G06F 17/30864* (2013.01)
(58) Field of Classification Search
CPC .................................................. G09B 19/0038
See application file for complete search history.

(56) References Cited

U.S. PATENT DOCUMENTS

| 2011/0165544 A1 | 7/2011 | Itaya et al. | |
| 2012/0295676 A1* | 11/2012 | Ackerson | A23L 33/00 463/1 |
| 2016/0074707 A1* | 3/2016 | Thorpe | G09B 19/0092 434/127 |

FOREIGN PATENT DOCUMENTS

WO 2010029845 A1 3/2010

* cited by examiner

*Primary Examiner* — Omkar Deodhar
(74) *Attorney, Agent, or Firm* — Holtz, Holtz & Volek PC

(57) ABSTRACT

According to one embodiment, an processing system comprises a memory, a receiver, and a transmitter. The memory stores first target information indicating a first target related to a first user, second target information indicating a second target related to a second user, a first rate indicating an achievement rate in a case where the first user has achieved the first target, and a second rate indicating an achievement rate in a case where the second user has achieved the second target. The receiving unit receives first situation information of the first user and second situation information of the second user. The transmitting unit transmits display information obtained by combining a first degree of achievement of the first target derived from the first situation information, a second degree of achievement of the second target derived from the second situation information, the first rate, and the second rate.

19 Claims, 14 Drawing Sheets

| PREVIOUS POSITION | TARGET CATEGORY | TARGET NUMERICAL VALUE | INITIAL VALUE |
|---|---|---|---|
| 48kg | MAKING A HEALTHY BODY (DIET) | 45kg | 50kg |

FIG.6

| GROUP ID INFO | USER ID INFO | TARGET CATEGORY | TARGET NUMERICAL VALUE | CURRENT POSITION | ACHIEVE-MENT RATE | DEGREE OF EFFORT | CONTRIBU-TION RATE | FINAL NUMBER OF PETALS (25 IN TOTAL) |
|---|---|---|---|---|---|---|---|---|
| 1 | A | MAKING A HEALTHY BODY (DIET) | -5kg | 0kg | 0% | - | 3/5 | 15 |
| 1 | B | MAKING A HEALTHY BODY (WEIGHT INCREASE) | +5kg | +2kg | 40% | - | 2/5 | 10 |
| ... | ... | ... | ... | ... | ... | ... | ... | ... |

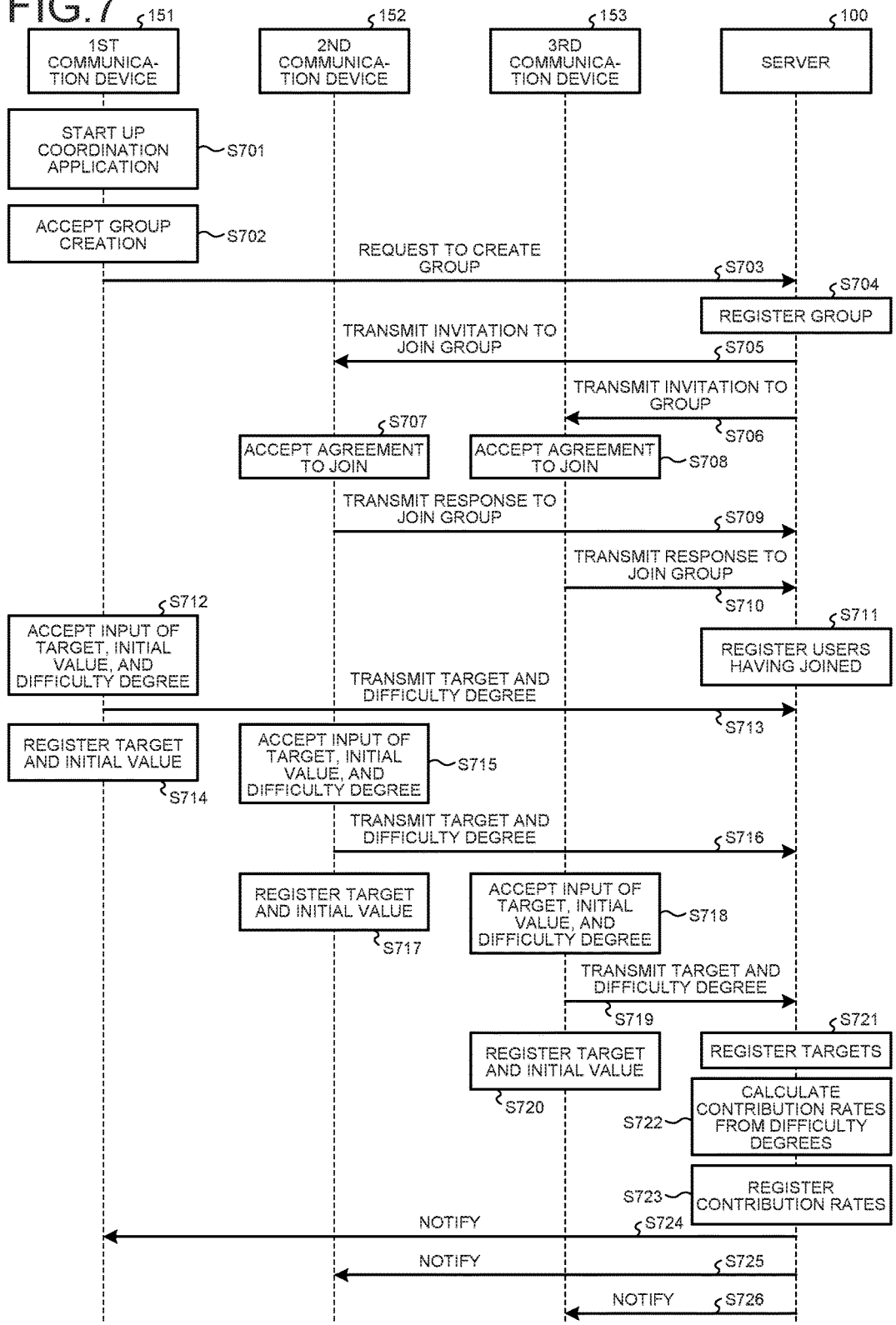

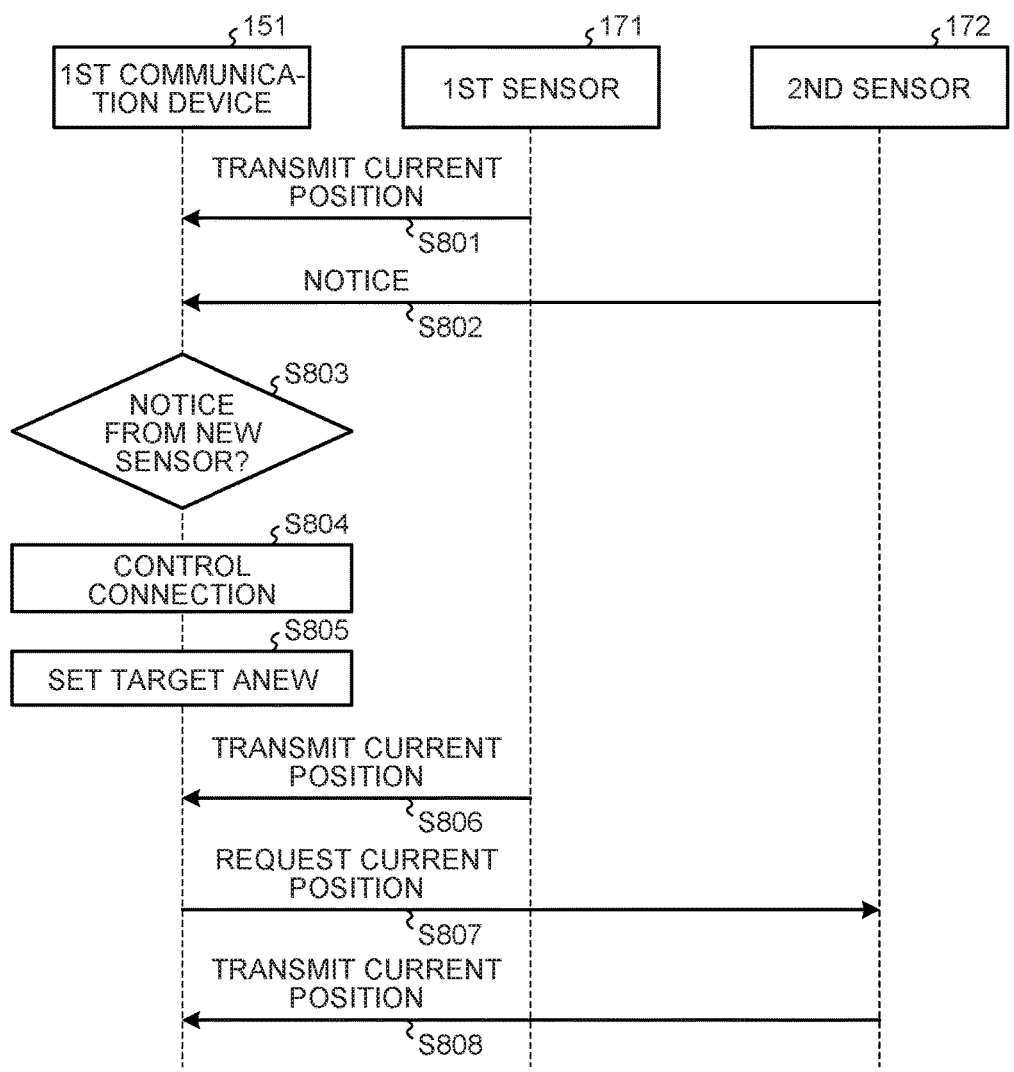

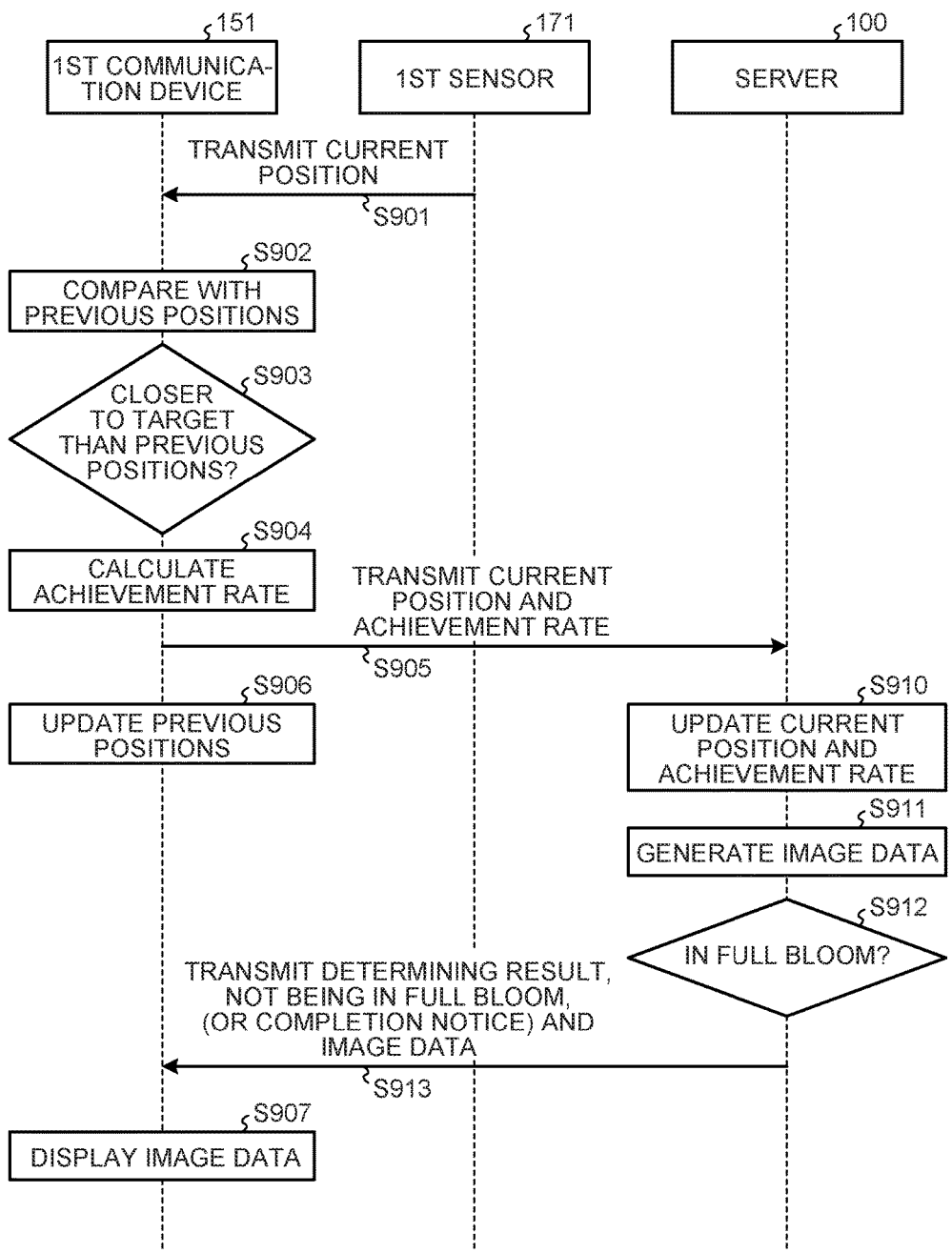

FIG. 12A

| GROUP ID INFO | USER ID INFO | TARGET CATEGORY | TARGET NUMERICAL VALUE | CURRENT POSITION | ACHIEVE-MENT RATE | DEGREE OF EFFORT | CONTRIBU-TION RATE | FINAL NUMBER OF PETALS (25 IN TOTAL) |
|---|---|---|---|---|---|---|---|---|
| 1 | A | MAKING A HEALTHY BODY (DIET) | -5kg | 0kg | 0% | - | 3/5 | 15 |
| 1 | B | MAKING A HEALTHY BODY (WEIGHT INCREASE) | 5kg | 3kg | 60% | - | 2/5 | 10 |
| ... | ... | ... | ... | ... | ... | ... | ... | ... |

FIG. 12B

| GROUP ID INFO | USER ID INFO | TARGET CATEGORY | TARGET NUMERICAL VALUE | CURRENT POSITION | ACHIEVE-MENT RATE | DEGREE OF EFFORT | CONTRIBU-TION RATE | FINAL NUMBER OF PETALS (25 IN TOTAL) |
|---|---|---|---|---|---|---|---|---|
| 1 | A | MAKING A HEALTHY BODY (DIET) | -5kg | 0kg | 0% | - | 21/25 | 21 |
| 1 | B | MAKING A HEALTHY BODY (WEIGHT INCREASE) | 5kg | 3kg | 60% | - | 4/25 | 4 |
| ... | ... | ... | ... | ... | ... | ... | ... | ... |

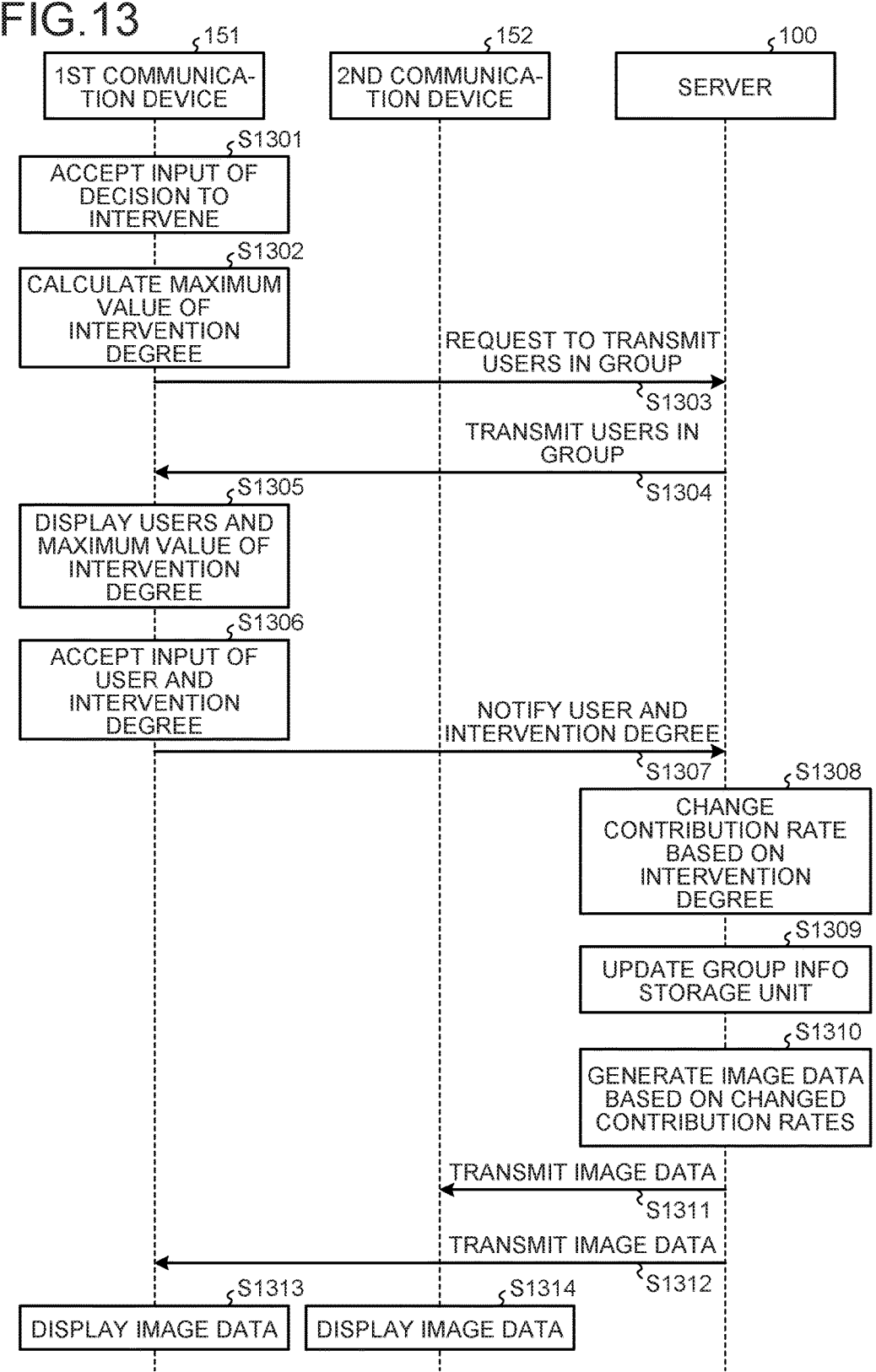

FIG.16

|  | DEGREE OF GROUP HARDSHIP | A | B | C | D | E | F |
|---|---|---|---|---|---|---|---|
| Gr.1 | 50% | 90% | 40% | 60% |  |  |  |
| Gr.2 | 30% | 8% |  |  | 90% | 60% |  |
| Gr.3 | 5% | 2% |  |  |  |  | 50% |

PROCESSING SYSTEM AND DISPLAY DEVICE

CROSS-REFERENCE TO RELATED APPLICATIONS

This application is based upon and claims the benefit of priority from Japanese Patent Application No. 2015-161361, filed on Aug. 18, 2015; the entire contents of which are incorporated herein by reference.

FIELD

Embodiments described herein relate generally to a processing system and a display device.

BACKGROUND

Attention is being paid to how computers will support lives of people. Related technologies are disclosed.

Although, with a conventional technology, the statuses of progress toward targets are displayed for users in a group, only displaying the statuses of progress may result in difficulty in maintaining the motivation of the users in the group.

Further, among conventional technologies, there are few technologies which manage progress for a plurality of persons with different targets.

BRIEF DESCRIPTION OF THE DRAWINGS

FIG. 6 is a diagram illustrating the table structure of a group information storage unit of the first embodiment;

FIG. 7 is a sequence diagram showing the procedure of group registration in the processing system of the first embodiment;

FIG. 8 is a sequence diagram showing the procedure of registration of a sensor in the communication device of the first embodiment;

FIG. 9 is a sequence diagram showing the procedure of updating positions in the communication device of the first embodiment;

FIGS. 12A and 12B are diagrams illustrating a change in information stored in the group information storage unit;

FIG. 13 is a sequence diagram showing the procedure of intervening in another user in the communication device of the first embodiment;

FIG. 16 is a diagram illustrating the table structure of a management storage unit of a second embodiment.

DETAILED DESCRIPTION

According to the present embodiment, a processing system comprises a memory, a receiver, and a transmitter. The memory stores first target information indicating a first target related to a first user in a first group, second target information indicating a second target related to second user in the first group, a first rate indicating an achievement rate in a case where the first user has achieved a first target, the second rate indicating an achievement rate in a case where the second user has achieved a second target. The receiver receives first situation information from a first device and second situation information from a second device, the first situation information indicating a position of the first user, the second situation information indicating a position of the second user. The transmitter transmits to the first and second devices display information obtained by combining a first degree of achievement of the first target derived from the first situation information, a second degree of achievement of the second target derived from the second situation information, the first rate, and the second rate.

First Embodiment

Figure 1:
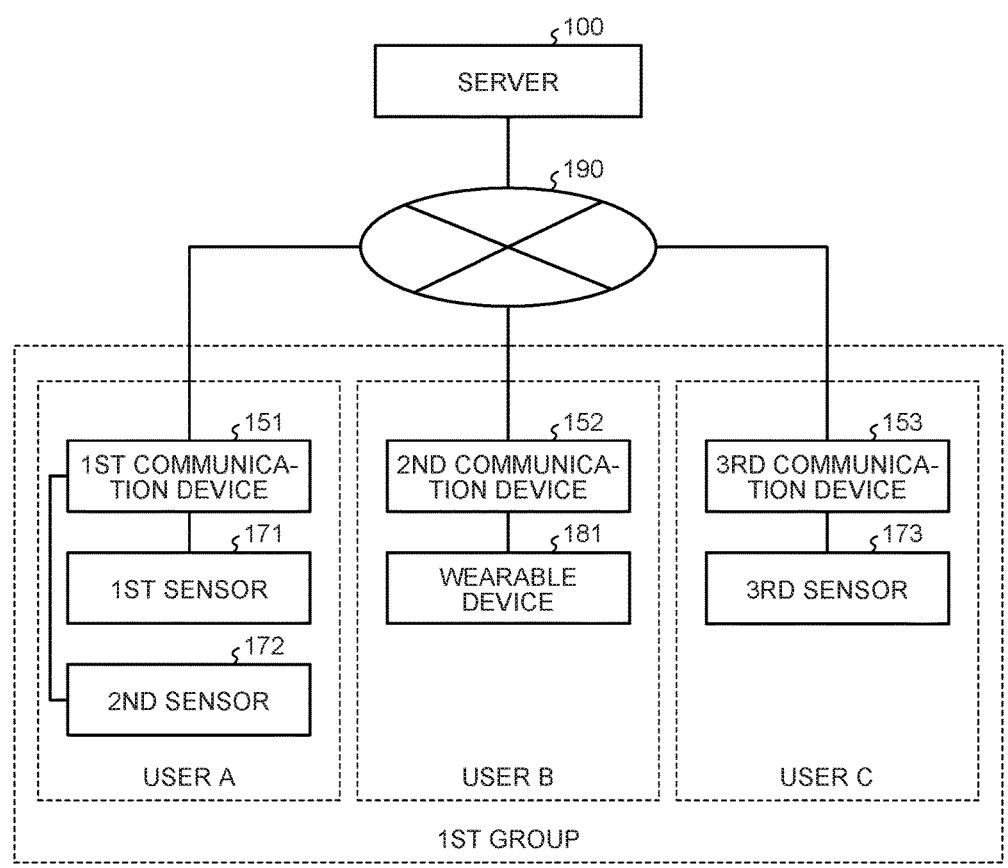
FIG. 1 is a diagram showing an example configuration of a processing system of a first embodiment.

FIG. 1 is a diagram showing an example configuration of a processing system of the present embodiment. In the processing system of the present embodiment, a server 100 can communicate with a first communication device 151, a second communication device 152, and a third communication device 153 via a public network 190. Although the present embodiment describes the case of a public network, any network via which information can be transmitted/received between communication devices can be used such as a LAN (Local Area Network) provided in a company.

Although the embodiment below describes an example where the invention is applied to a communication device as an example information display device, it may be applied to another device.

In the present embodiment, the server 100 collects data about the activities of users in a group via the communication devices 151 to 153. The activity data is data indicating user activity statuses detected by sensors attached to the users (e.g., a first, second, and third sensors 171, 172, 173) and wearable devices (e.g., a wearable device 181).

The server 100 is, for example, a health care system. The server 100 lets the users in a group recognize their progresses toward their targets using their activity data. Further, the server 100 provides progress statuses collectively for the users in the group until they reach targets. Thus, the users in the group can recognize progress of the other users as well. The users can ascertain progress of the other users and realize that other users are making efforts and producing results, so that they can maintain their motivation. And by maintaining their motivation, the target achievement of the users in the group can be facilitated. In addition, the users can support other users to achieve their targets.

Although the present embodiment describes an example where the server 100 comprises the above means, it may be realized by a plurality of information processing devices in combination.

The group is formed of a plurality of users each having a target. Note that the individual targets of the users in the group may be different.

Each user in the group installs a coordination application to be in coordination with the server 100 in the communication device beforehand.

Each user in the group enters a target via the coordination application. Then the communication device transmits the entered target to the server 100.

Thus, the server 100 can manage the target of each user in the group. When all the targets set by the users in the group are achieved, the present embodiment processes as the entire group has achieved a target. Accordingly, each user needs to motivate other users who seem to have difficulty in reaching their targets, in order for the entire group to achieve a target.

The first communication device 151 is one which a user A in a first group possesses. The first communication device 151 collects activity data of user A from the first sensor 171 and the second sensor 172 connected thereto via radio or a wire and records that information as a life log of user A. The sensors for collecting activity data of user A may be incorporated in the communication device. Further, the first communication device 151 transmits activity data, related to the achievement of the target decided on by user A, out of the collected activity data to the server 100.

The sensor connected to the first communication device 151 collects information about user A, for example the sensor is a weight scale or a "manpokei" (registered trademark) (pedometer) to which a communication interface is added.

The activity data is data about the activities of user A and can be, for example, weight and the number of steps taken. Further, the activity data may be data which a user directly enters into a communication device, such as the result of an English examination or the number of memorized English words.

The second communication device 152 is one which a user B in the first group possesses. The second communication device 152, like the first communication device 151, collects activity data of user B from the wearable device 181 connected thereto via radio and transmits the activity data to the server 100.

The third communication device 153 is one which a user C in the first group possesses. The third communication device 153, like the first communication device 151, collects activity data of user C from the third sensor 173, with which it can communicate via radio, and transmits the activity data to the server 100.

Each time the level of the achievement of the target of a user in the group changes, the server 100 of the present embodiment transmits image data indicating the progress toward target achievement of the group to the communication devices in the group.

Figure 2:
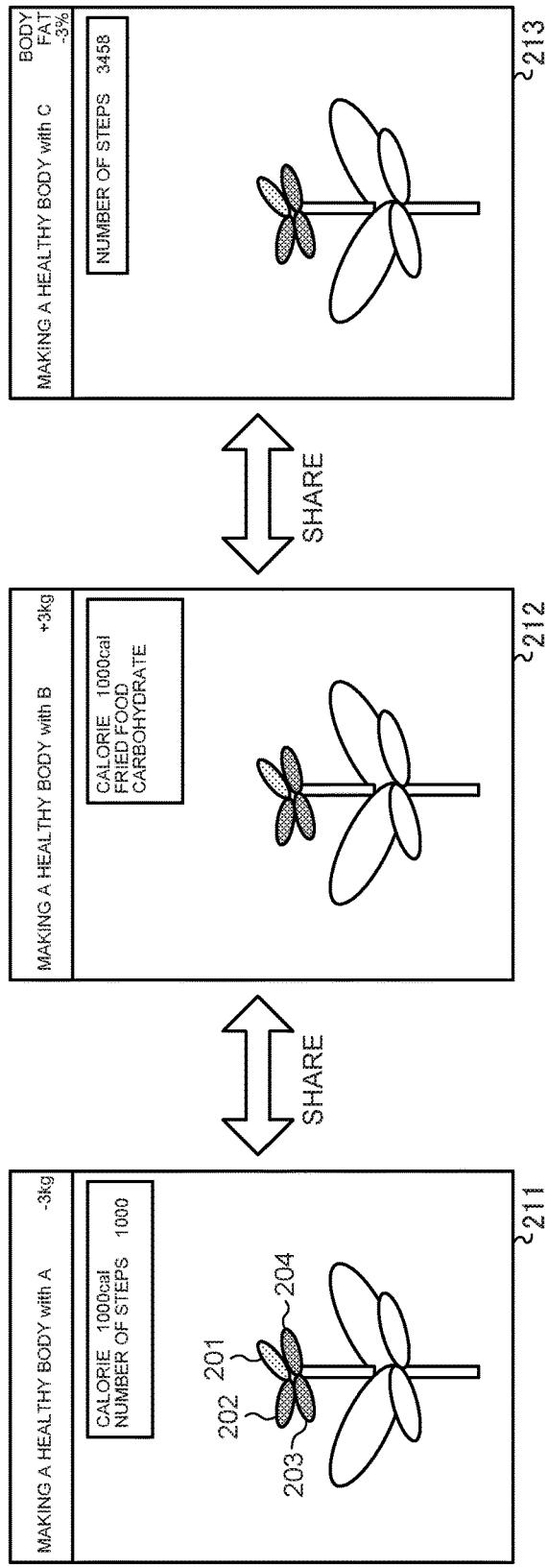
FIG. 2 is a figure showing example image data transmitted by a server of the first embodiment.

FIG. 2 is figure showing example image data transmitted by the server 100 of the present embodiment. In the example shown in FIG. 2, the server 100 transmits image data 211 to the first communication device 151. Further, the server 100 transmits image data 212 to the second communication device 152 and transmits image data 213 to the third communication device 153. As shown in image data 211, 212, 213, the character string displayed is different for each communication device, but the image data transmitted to the communication devices is common to them. Although the present embodiment describes the example where the character string displayed is different for each communication device, the invention is not limited to this way of displaying.

For example, the character strings displayed on the communication devices may be made the same, so that all the users in the group share information.

The numbers of petals shown in image data 211, 212, 213 indicate the degrees of target achievement of the users. In the present embodiment, a different color of petals are set for each user. For example, petals 202 to 204 indicate the degree of target achievement of user A, and a petal 201 indicates the degree of target achievement of user B. Because there is no progress toward the target of user C, no petal of the color set for user C is produced. As such, each user can realize the degree of progress of the user with respect to the target achievement of the entire group by referring to the image data.

In the present embodiment, for each user, the number of petals produced when the user has achieved the target is set, considering the difficulty level of the target of the user.

The image data transmitted by the server 100 increases in the number of petals each time a user comes closer to the target. Then when all the users in the group have achieved their targets, the server 100 transmits image data indicating that the flower is in full bloom. Thus, all the users in the group can obtain a feeling of satisfaction that the entire group has achieved the target.

Although the present embodiment describes the example where the degree of target achievement of each user is indicated by the number of petals, the method is not limited to show the petals. Instead, other method can also be used.

Figure 3:
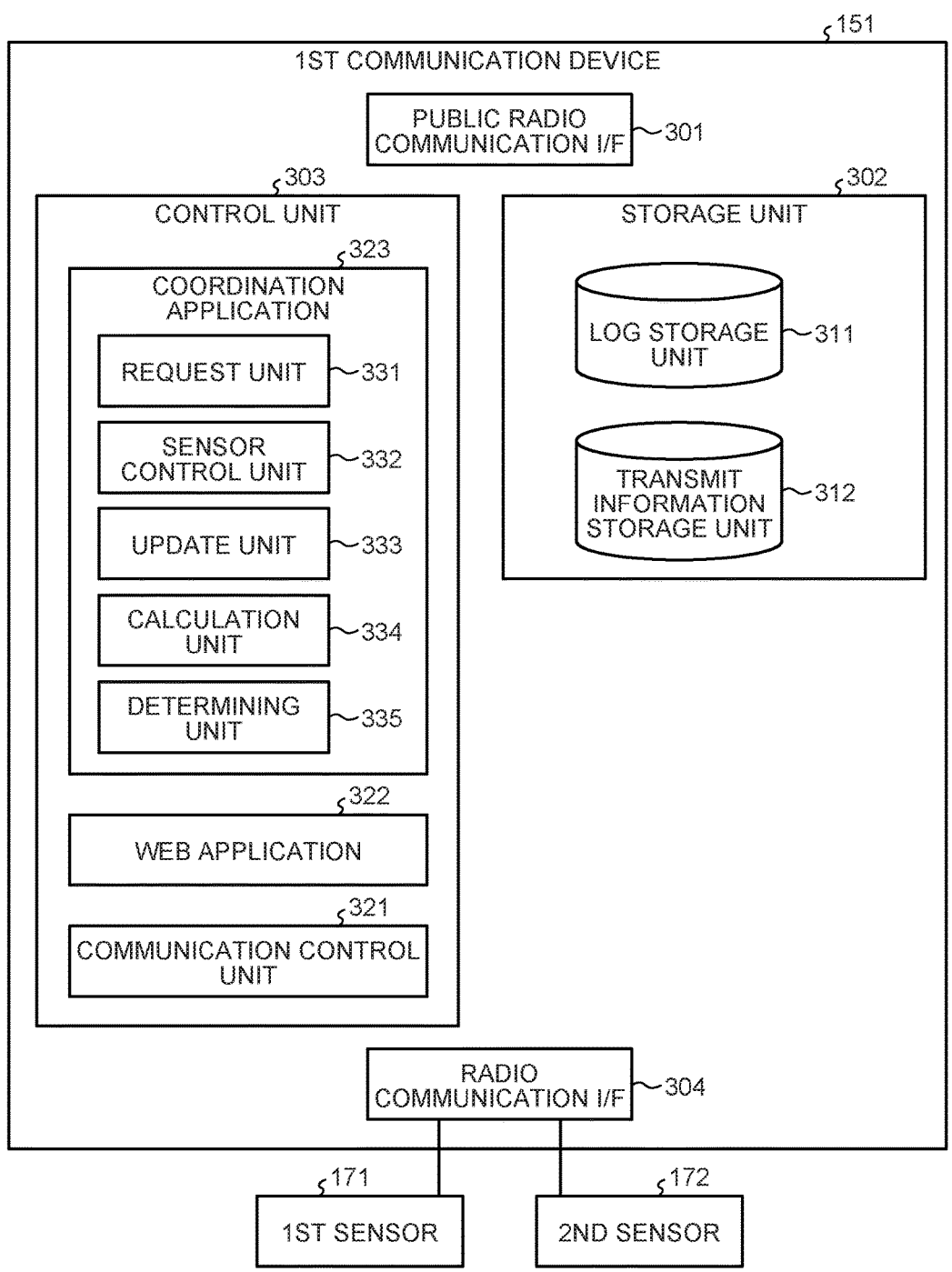
FIG. 3 is a diagram showing an example configuration of a first communication device of the first embodiment.

FIG. 3 is a diagram showing an example configuration of the first communication device 151 of the embodiment. As shown in FIG. 3, the first communication device 151 comprises a public radio communication I/F 301, a storage unit 302, a control unit 303, and a radio communication I/F 304. The other communication devices such as the second and third communication devices 152, 153 has the same configuration as the first communication device 151, with description thereof being omitted.

The public radio communication I/F 301 is an interface module for communicating with the public network 190.

The radio communication I/F 304 is a radio communication interface module which can communicate with sensors (e.g., the first sensor 171 and the second sensor 172) or wearable devices. In the present embodiment, it is possible to perform radio communication using Bluetooth (registered trademark), but another radio communication standard may be used. Although the present embodiment describes an example where radio communication is used to communicate with sensors or wearable devices, wire communication may be used.

The storage unit 302 is a nonvolatile memory such as a ROM (Read Only Memory). The storage unit 302 of the embodiment comprises a log storage unit 311 and a transmit information storage unit 312.

The log storage unit 311 continues recording activity data and the like of user A collected via sensors (e.g., the first sensor 171 and the second sensor 172) or wearable devices.

Figures 4, 5:
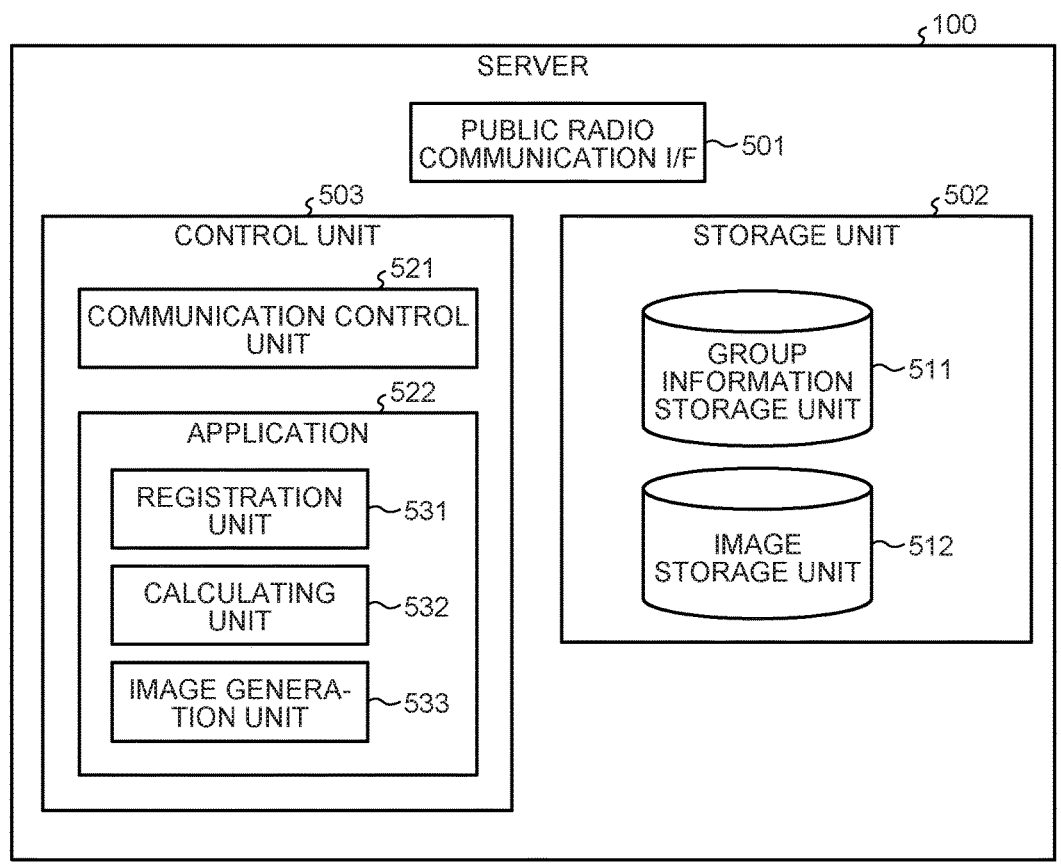
FIG. 4 is a diagram illustrating the table structure of a transmit information storage unit of the first embodiment.
FIG. 5 is a diagram showing an example configuration of the server of the first embodiment.

The transmit information storage unit 312 stores activity data related to target achievement of user A, out of activity data recorded in the log storage unit 311, to transmit the server 100. FIG. 4 is a diagram illustrating the table structure of the transmit information storage unit 312 of the embodiment. As shown in FIG. 4, the transmit information storage unit 312 stores previous positions, a target category, a target numerical value, and an initial value, in association with each other.

The target category indicates the category of a target to be achieved by user A. "Making a healthy body" and "English learning" can be cited as examples thereof. The target numerical value indicates a numerical value set as a target. For example, in the case of the target category "making a healthy body", a specific numerical value such as a weight or a body fat percentage is set. "Previous position" has recorded therein the numerical value which is the closest to the target from among numerical values (activity data) measured up to the preceding time. The initial value has recorded therein the numerical value (activity data) measured when the target was set.

For example, where a target numerical value of "45 kg" is set for the target category "making a healthy body (diet)" and where "48 kg" is set as "previous position", when a weight measured by the first sensor 171 or the second sensor 172 comes closer to the target numerical value of "45 kg" than the "48 kg", a process is performed.

The control unit 303 comprises a CPU (not shown), a RAM (not shown), and the like. In the control unit 303 of the embodiment, the CPU of the control unit 303 executes programs recorded in the storage unit 302 or the like, and thereby expands and runs the configurations of a communication control unit 321, a web application 322 and a coordination application 323 on the RAM.

The communication control unit 321 communicates with the public network 190 using the public radio communication I/F 301. For example, the communication control unit 321 controls transmitting/receiving information to/from the server 100 via the public network 190.

The web application 322 is a program for users referring to image data or document data transmitted from the server 100.

The coordination application 323 comprises a sensor control unit 332, an update unit 333, a calculation unit 334, and a determining unit 335 and is an application which controls in coordination with the server 100 the entire group achievement of a target.

Further, the coordination application 323 performs control to transmit various requests to the server 100 via the communication control unit 321.

The sensor control unit 332 controls sensors (e.g., the first sensor 171 and the second sensor 172) or wearable devices which can communicate with the first communication device 151 and receives information (e.g., activity data) about user A, from the sensors or wearable devices.

The update unit 333 updates the log storage unit 311 and the transmit information storage unit 312. For example, the update unit 333 updates the log storage unit 311 and the transmit information storage unit 312 with activity data of user A received by the sensor control unit 332.

The calculation unit 334 calculates the target achievement rate of user A based on the activity data received by the sensor control unit 332. The calculation unit 334 can calculate the target achievement rate of user A on the basis of either a received value from the sensor control unit 332 or a value directly input by the user A via a user interface.

Calculation of the rate of achievement is, for example, where the target category in the transmit information storage unit 312 is "making a healthy body (diet)" with the target numerical value "45 kg" and the initial value "50 kg", the calculation unit 334 calculates the achievement rate as 40% when the sensor control unit 332 receives a weight of "48 kg".

The determining unit 335 determines whether the current activity data received by the sensor control unit 332 is closer to the target than the previous positions stored in the transmit information storage unit 312. If the determining unit determines that it is closer to the target than the previous positions, the communication control unit 321 transmits the activity data and updated achievement rate to the server 100.

FIG. 5 is a diagram showing an example configuration of the server 100 of the embodiment. As shown in FIG. 5, the server 100 comprises a public radio communication I/F 501, a storage unit 502, and a control unit 503.

The public radio communication I/F 501 is an interface module for communicating with the public network 190.

The storage unit 502 is a nonvolatile memory such as a ROM (Read Only Memory) or a HDD (Hard Disk Drive). The storage unit 502 of the embodiment comprises a group information storage unit 511 and an image storage unit 512.

The group information storage unit 511 stores information related to the group. FIG. 6 is a diagram illustrating the table structure of the group information storage unit 511. As shown in FIG. 6, the group information storage unit 511 stores group identification information, user identification information, a target category, a target numerical value, a current position, an achievement rate, the degree of effort, a contribution rate, and the final number of petals, in association with each other. The group identification information is information to identify a group. The user identification information can be, for example, a user ID. The target category and target numerical value are a category and numerical value indicating the target of the user in the group.

The current position is activity data last transmitted from the communication device of the user. The achievement rate indicates the extent to which the measurement has approached the target numerical value with respect to the initial value when the target was set. The achievement rate is data last transmitted from the communication device of the user.

The degree of effort of the user may also be stored. For example, in the case of the target category "making a healthy body (diet)", the number of times of weighing on a scale or the number of steps taken is stored. This degree of effort may be reflected in image data generated by an image generation unit 533.

The contribution rate indicates the target achievement rate of the group when the user has achieved the user's target. For example, the contribution rate of 0.4 indicates that the target achievement rate of the group is 40% when the user has achieved the target.

The final number of petals indicates the number of petals shown in flower image data when the user has achieved the target. The final number of petals of the embodiment is calculated by multiplying the number of petals in full bloom by the contribution rate. Although in the embodiment the number of petals in full bloom is 25, an appropriate number of petals will be set according to the implementation.

The image storage unit 512 stores image data for generating flower image.

The control unit 503 comprises a CPU (not shown), a RAM (not shown), and the like. In the control unit 503 of the embodiment, the CPU of the control unit 503 executes programs in the storage unit 502 or the like, and thereby expands and runs the configurations of a communication control unit 521 and an application 522 on the RAM.

The communication control unit 521 communicates with the public network 190 using the public radio communication I/F 501. For example, the communication control unit 521 controls transmitting/receiving information to/from the communication devices 151 to 153 via the public network 190.

For example, the communication control unit 521 receives activity data indicating the status of user A from the first communication device 151 and activity data indicating the status of user B from the second communication device 152.

In another example, the communication control unit 521 transmits image data generated by the image generation unit 533 to the first and second communication devices 151, 152.

The application 522 comprises a registration unit 531, a calculating unit 532, and the image generation unit 533 and is configured to control in coordination with the communication devices the entire group to achieve a target.

The registration unit 531 registers and updates information in the group information storage unit 511. For example, when receiving a request to create a group from a communication device, the registration unit 531 registers a record of each user in the group. In another example, based on the current activity data and achievement rate of a user from a communication device, the registration unit 531 updates the record.

The calculating unit 532 calculates for each user the contribution rate indicating the target achievement rate of the group when the user has achieved the target in the group. Further, the calculating unit 532 of the embodiment sets the contribution rate for each user based on the degree of difficulty and the like of the target when the user sets a target at the time of group creation. Then the registration unit 531 registers the set contribution rates in the group information storage unit 511.

The image generation unit 533 generates flower image data indicating the target achievement rate of each user. Each time the group information storage unit 511 is updated, the image generation unit 533 of the embodiment refers to the group information storage unit 511 to generate image data for each group. Then the communication control unit 521 transmits image data generated for each group to each of the communication devices in the group.

The flower image data is an example of image representing a group progress, and the number of petals indicates the degree of target achievement of the entire group which is obtained according to the degree of target achievement of each user of the group and the contribution rate of each user of the group.

Thus, the public radio communication I/Fs 301 of the communication devices (the first, second, and third communication devices 151, 152, 153) receive the flower image data from the server 100. Then the web applications 322 of the communication devices (the first, second, and third communication devices 151, 152, 153) display the flower image data.

In other words, the flower image data indicates information about the target achievement rate based on activity data received from sensors or wearable devices connected to the communication device of a user (e.g., user A) and about the target achievement rate of another user (e.g., user B) in the same group.

As described above, in the flower image data, even if the achievement rate of a plurality of targets are same, the number of the petals assigned for each target is different, because the number of the petals displayed at the achievement rate with respect to the contribution rate changes.

Next, a group registration in the processing system of the present embodiment will be described. FIG. 7 is a sequence diagram showing the procedure of the group registration in the processing system of the embodiment.

First, the first communication device 151 starts up the coordination application 323 according to operation (S701).

Then the coordination application 323 of the first communication device 151 accepts creation of a new group via a user interface screen (S702). During the creation operation of the group, it also accepts the selection of users to invite to the group.

Then the coordination application 323 transmits a request to create the group to the server 100 via the communication control unit 321 (S703). The request to create includes user identification information of users to be invited to the group.

If the communication control unit 521 of the server 100 receives the request to create the group, the registration unit 531 registers group identification information, uniquely assigned each time it receives a request to create a group, associated with user identification information of the first communication device 151, in the group information storage unit 511 (S704). Thus, the group is registered.

Then the communication control unit 521 of the server 100 transmits an invitation to join the group to the second and third communication devices 152, 153 based on user identification information of users to invite to the group, contained in the request to create the group (S705, S706).

If the second communication device 152 receives the invitation to join the group from the server 100, the coordination application 323 of the second communication device 152 displays a message to that effect. Then if the coordination application 323 of the second communication device 152 accepts the invitation (S707), the communication control unit 321 of the second communication device 152 transmits a response to the effect that it will join the group, together with user identification information of user B, to the server 100 (S709).

If the third communication device 153 receives the invitation to join the group from the server 100, the coordination application 323 of the third communication device 153 displays a message to that effect. Then if the coordination application 323 of the third communication device 153 agrees to join (S708), the communication control unit 321 of the third communication device 153 transmits a response to the effect that it will join the group, together with user identification information of user C, to the server 100 (S710).

Then the registration unit 531 of the server 100 registers records of user B and user C, who have joined the group, together with the group identification information in the group information storage unit 511 (S711).

Then the coordination application 323 of the first communication device 151 accepts the input of a target (a target category and target numerical value), an initial value, and the degree of difficulty (S712). In the present embodiment, the target (target category and target numerical value) and the degree of difficulty are entered by a user via a UI. The initial value may be inputted by a user or a sensor (e.g., the first sensor 171 or the second sensor 172) which can communicate with the first communication device 151.

The communication control unit 321 of the first communication device 151 transmits the inputted target (target category and target numerical value) and the degree of difficulty to the server 100 (S713). The update unit 333 of the first communication device 151 registers the inputted target category, target numerical value, previous positions, and initial value in the transmit information storage unit 312 (S714). In the present embodiment, immediately after the information about the user is registered in the transmit information storage unit 312, the initial value is set as the "previous position".

The coordination application 323 of the second communication device 152 accepts the input of a target (a target category and target numerical value), an initial value, and the degree of difficulty (S715).

The communication control unit 321 of the second communication device 152 transmits the inputted target (target category and target numerical value) and the degree of difficulty to the server 100 (S716). The update unit 333 of the second communication device 152 registers the inputted target category, target numerical value, previous positions, and initial value in the transmit information storage unit 312 (S715).

The third communication device 153 also performs the same process as the second communication device 152 in S715 to S717 (S718 to S720).

Then the registration unit 531 of the server 100 registers the target (target category and target numerical value) for each user in the group information storage unit 511 (S721).

The calculating unit 532 of the server 100 calculates the contribution rate for each user from the degree of difficulty of the user's targets (S722). Then the registration unit 531 of the server 100 registers the contribution rate for each user in the group information storage unit 511 (S723). Note that any method can be used for calculating the contribution rate from the degree of difficulty.

The communication control unit 521 of the server 100 notifies the communication devices 151 to 153 that the registration of the group has finished (S724 to S726).

In the present embodiment, by the above process, the server 100 can manage information about the users in the group.

The present embodiment is not limited to the user setting only one target in the group, but a plurality of targets may be set. The way to set a plurality of targets can be input of a target category, target numerical value, initial value, and the degree of difficulty at S715 or S718. For example the coordination application 323 can accept the input for each target from a user. The input of which was accepted is transmitted to the server 100. The plurality of targets of one user can be, for example, a plurality of targets different in target category, or so on.

Then at S721, the registration unit 531 of the server 100 registers the plurality of targets (target categories and target numerical values) as separate records, for the same user in the same group (in other words, for the same user identification information and the same group identification information), in the group information storage unit 511.

Then at S722, the calculating unit 532 of the server 100 calculates the contribution rate for each target and, at S723, the registration unit 531 of the server 100 registers the contribution rate calculated for each target for the one user in the group information storage unit 511.

By this means, the plurality of targets for the one user can be registered. In image data (shown in, e.g., FIG. 2) for displaying achievement rates, to be transmitted by the server 100 of the embodiment to the communication devices, if there are a plurality of targets for one user, different colors may be assigned to the targets respectively, or the colors are only different among the users, even if some users may have a plurality of targets.

Further, in the present embodiment, a user can also join a group in mid-course. For example, when receiving a request to join the group from the communication device, the server 100 starts processing to allow the user to join the group.

For example, the server 100 of the embodiment registers information about a user who joins in mid-course in the group information storage unit 511. Thus, the server 100 can manage information about the user who has joined in mid-course. At this time, the calculating unit 532 of the embodiment re-calculates the contribution rate for each user so that the total rates of all the users in the group including the user who has joined in mid-course becomes one. Then the registration unit 531 updates the group information storage unit 511 with the re-calculated contribution rate for each user.

Also, in the present embodiment, a user can leave the group in mid-course. For example, when receiving a request to leave the group from the communication device of that user, the server 100 starts processing to remove the user from the group.

For example, the server 100 of the embodiment removes information about the user who has requested to leave in mid-course from the group information storage unit 511. At this time, the calculating unit 532 of the embodiment re-calculates the contribution rate for each user so that the total rates of all the users in the group excluding the removed user becomes one. Then the registration unit 531 updates the group information storage unit 511 with the re-calculated contribution rate for each user.

In the present embodiment, new sensors may be connected to communication devices. Next, the registration of a sensor in a communication device of the embodiment will be described. FIG. 8 is a sequence diagram showing the procedure of the above process in a communication device of the embodiment. In the example shown in FIG. 8, it is supposed that the first communication device 151 is already connected to the first sensor 171 and that the registration of the group is already finished.

The first sensor 171 transmits a detection result indicating the current position to the first communication device 151 (S801). Thus, the first communication device 151 can determine whether the degree of target achievement has increased.

Further, the sensor control unit 332 of the first communication device 151 receives a notice from the second sensor 172 via the radio communication I/F 304 (S802).

Then the sensor control unit 332 determines whether the notice comes from a new sensor (S803). In the FIG. 8, the control unit determines that it is a notice from the second sensor 172 that is a new sensor. If it determines that the notice is not one from a new sensor, the process finishes.

Then if determined that the notice is from a new sensor, the sensor control unit 332 controls connection with the second sensor 172 (S804). Then the coordination application 323 accepts, if necessary, new target of the user (S805). That is, if it is connected to the second sensor 172, the communication device can set a new target using activity data from the second sensor 172. FIG. 8 is an example where a target is achieved based on activity data obtained by combining a detection result of the first sensor 171 and a detection result of the second sensor 172. The communication control unit 321 of the first communication device 151 transmits the target to the server 100. Thus, the server 100 can update targets to manage.

Then the first sensor 171 transmits a detection result indicating the current position to the first communication device 151 (S806).

The second sensor 172 transmits a detection result as the current position (S808).

Thus, the first communication device 151 can determine whether the degree of target achievement has come nearer based on the detection result of the first sensor 171 and the detection result of the second sensor 172.

Although the example shown in FIG. 8 describes setting a new target when adding a new sensor, setting a new target is not limited to cases where a new sensor is added. For example, the communication device may accept a new target (e.g., a target numerical value) from the user. Setting a new target is not limited to setting a new target numerical value. A new target category may be set.

For example, suppose that the coordination application 323 of the first communication device 151 has accepted user A's new target numerical value. In this case, the update unit 333 of the coordination application 323 updates the target numerical value stored in the transmit information storage unit 312. The communication control unit 321 transmits a request to update the target numerical value to the server 100.

When the communication control unit 521 of the server 100 receives the request to update the target numerical value, the registration unit 531 of the application 322 updates the target numerical value in the record of the first communication device of user A, in the group information storage unit 511. Thus, the target numerical value can be set a new.

Further, the communication device of the embodiment can accept adding a target (a target category, target numerical value, initial value [current status], the degree of difficulty, and the like). In this case, the update unit 333 of the coordination application 323 adds a record about a new target (e.g., a target different in target category from the previously registered target) to the transmit information storage unit 312.

Then the communication control unit 321 transmits a request to add the target to the server 100. The request to add the target includes user identification information and group identification information as well as the target category, numerical target value, initial value (current status), and degree of difficulty to be added.

Thus, the registration unit 531 of the application 322 of the server 100 can add a record for the new target to the group information storage unit 511 using the received information.

Further, the calculating unit 532 re-calculates the contribution rate for each target of all the users in the group considering the received degree of difficulty. The re-calculation is performed so that the total contribution rate in the group including the added target becomes one.

In the present embodiment, the re-calculation of the contribution rates of all the users in the group is not limited to cases where a new user joins or where a user adds a new target, but the calculating unit 532 may periodically re-calculate the contribution rates in the group dynamically.

Further, re-calculation of the contribution rate for each target is not limited to a method based on only the degree of difficulty for each target, but a combination with another element may be used. For example, in re-calculating the contribution rate for each target, the calculating unit 532 may re-calculate the contribution rate for each target based on the degree of difficulty and on the number of targets which the user has. Thus, the contribution rate of a user who has more targets of high degrees of difficulty becomes larger. Therefore, in the flower image data indicating the achievement rate of each user by the number of petals, the rate of increase in the number of petals for such user, so that the achievement rate can be further felt visually emphasized. Hence, the motivation of the user to achieve the targets can be improved.

Then the registration unit 531 updates the group information storage unit 511 with the contribution rate re-calculated for each target of all the users in the group. Thus, addition of a target can be realized.

Then the image generation unit 533 of the server 100 generates image data to display achievement rates based on the updated group information in storage unit 511.

The present embodiment has described separately the case where a plurality of targets of users are registered at the beginning and the case where targets are added in mid-course. However, the present embodiment does not distinguish between at the beginning and in mid-course, but any method can be used as long as targets can be registered or added at any stage. For example, in the present embodiment, common modules may be used to set a plurality of targets without distinguishing between at the beginning and in mid-course. Thus, the development burden can be reduced.

The common modules are ones which re-calculates contribution rates each time a target is registered. In this case, the processing burden will become larger. Accordingly, in the present embodiment, the communication device is set to upload a plurality of targets together to the server 100 collectively, or the server 100 is set not to calculate contribution rates until a predetermined time limit, or so on, and thereby the number of times of contribution rate re-calculation can be reduced. Thus, the burden in re-calculations on the server 100 can be reduced.

Further, users can delete a target. In this case, the registration unit 531 of the application 322 of the server 100 deletes the record for that target from the group information storage unit 511. Further, as in the case of adding a target, the calculating unit 532 re-calculates the contribution rate for each target of all the users in the group excluding the deleted target. Then the registration unit 531 updates the group information storage unit 511 with the contribution rate re-calculated for each target of all the users in the group. Thus, deletion of a target can be realized.

Next, the process of updating positions in a communication device of the embodiment will be described. FIG. 9 is a sequence diagram showing the procedure of the updating position in a communication device of the embodiment. In the example shown in FIG. 9, it is assumed that the registration of the group in the first communication device 151 is finished. Further, in this example, the degree of target achievement is determined based on activity data detected by the first sensor 171.

First, the first sensor 171 transmits a detection result (activity data) as the current position to the first communication device 151 (S901).

Then the determining unit 335 compares the current position with the previous positions stored in the transmit information storage unit 312 (S902). Then referring to the transmit information storage unit 312, the determining unit 335 determines whether the current position is closer to the target than the previous positions (S903). The sequence diagram shown in FIG. 9 describes the case where the current position is closer to the target than the previous positions. If it is determined that it is farther from the target than the previous positions, no process has to be performed, and hence a description thereof is omitted.

Then the calculation unit 334 calculates the achievement rate from the current position, the initial value, and the target numerical value (S904). Next, the communication control unit 321 transmits the current position and the achievement rate to the server 100 (S905). Then the update unit 333 updates the previous positions stored in the transmit information storage unit 312 with the current position (S906).

Meanwhile, when receiving the current position and the achievement rate, the server 100 updates the current position and the achievement rate in the record of the user of the transmission source stored in the group information storage unit 511 (S910).

Then the image generation unit 533 of the server 100 generates image data based on information stored in the group information storage unit 511 (S911). The image generation unit 533 of the embodiment generates flower image data indicating the achievement rate of each user by the number of petals based on the records of the users in the group including the user of whom the record has been updated.

Then the image generation unit 533 of the server 100 determines whether the flower represented by the image data is in full bloom, that is, whether all the users in the group have achieved targets (S912).

If it determines that the flower is not in full bloom, the communication control unit 521 of the server 100 transmits the determining result indicating not in full bloom and the image data to the communication devices of all the users of the group including the first communication device 151 (S913). If the unit 533 determines that the flower is in full bloom, the communication control unit 521 transmits a completion notice and the image data to the communication devices of all the users of the group.

Then the application 322 of the first communication device 151 displays the received image data (S907).

Each time the current position of a user changes, image data reflecting the changed position is delivered according to the above process procedure.

Figure 10C:
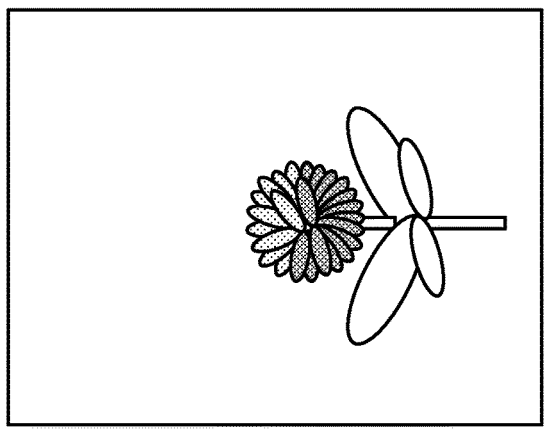
FIGS. 10A to 10C are figures illustrating the transition of image data transmitted by the server of the first embodiment.
Figure 10B:
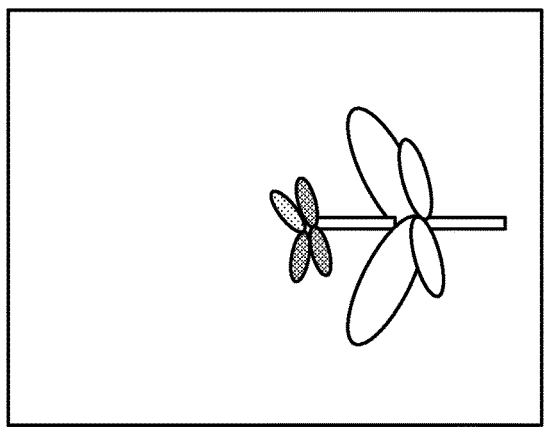
Figure 10A:
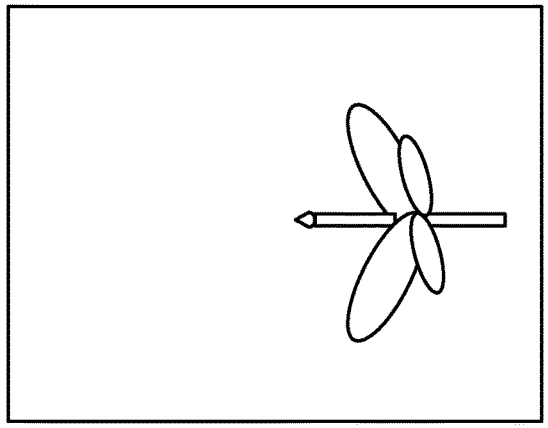

FIGS. 10A to 10O are figures illustrating the transition of image data transmitted by the server 100. In the example shown in FIGS. 10A to 10O, two users belong to a group.

As shown in FIG. 10A, immediately after group creation, image data representing the state of not having petals is transmitted to the communication devices of all the users in the group.

Thereafter, as shown in FIG. 10B, image data with some petals added according to the position of the users in the group, is transmitted to the communication devices of all the users in the group. As such, each time a positions of a user the group comes closer to the target, further petals are added.

Thereafter, as shown in FIG. 10O, when all the users in the group have achieved the targets, image data representing the flower in full bloom (ending image data) is transmitted to the communication devices of all the users in the group.

In the example shown in FIG. 10O, because the contribution rate is different for each user, the number of petals in full bloom is different between one user and the other. This contribution rate may be 40% for the user if one user has difficulty in succeeding in diet and 60% for the other. In this case, 10 petals for the one user and 15 petals for the other show completion of the group target.

As such, as long as all the users in the group have not achieved the targets, image data representing the flower in full bloom is not transmitted, and hence the users in the group can improve the motivation together until the last one in the group achieves the target thus achieve the target in the group.

Further, the users in the group can work on other users in order for the entire group to achieve the target. In the present embodiment, by making petals fall in the display (in other words, by reducing the number of petals), users are encouraged to achieve their targets.

Figure 11A:
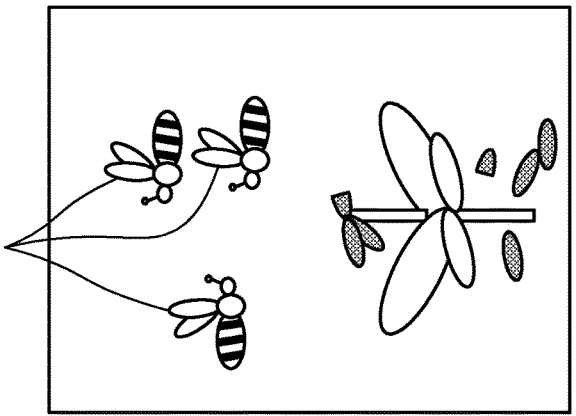
FIGS. 11A to 11C are figures illustrating the transition of example screens where user B encourages user A to achieve his or her target.
Figure 11B:
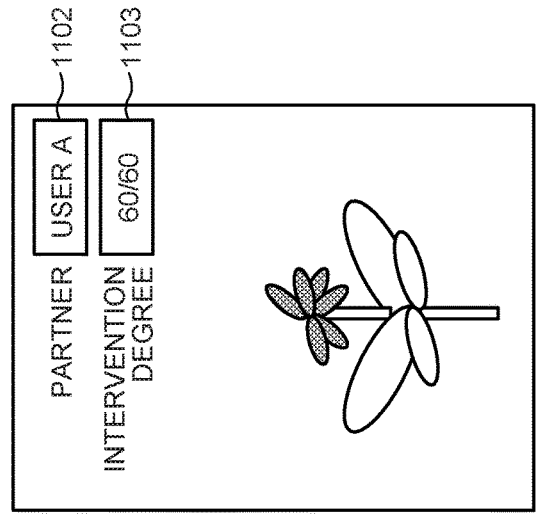
Figure 11C:
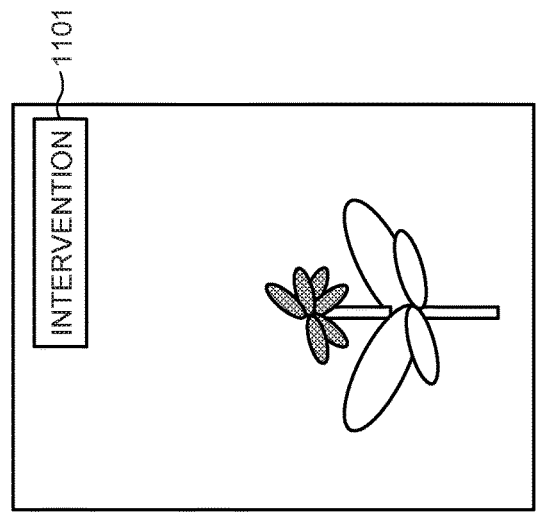

FIGS. 11A to 11C are figures illustrating the transition of example screens where user B encourages user A to achieve his or her target. In the example shown in FIGS. 11A to 11C, user A and user B belong to a group. And it is assumed that while user B is working hard to achieve his or her target, user A is starting no action to achieve his or her target.

Where the example screen shown in FIG. 11A is displayed, information as shown in FIG. 12A is stored in the group information storage unit 511. As shown in FIG. 12A, for user B, let the contribution rate be 40% and the achievement rate be 60%. Hence, in FIG. 11A, six petals (25×0.4×0.6=6, where 25 is the number of petals in full bloom) to indicate the degree of achievement of user B are produced. Because the achievement rate of user A is 0%, petals indicating the degree of achievement of user A are not produced.

Accordingly, by pushing down an intervention button 1101 of FIG. 11A, user B can perform control to improve the motivation of user A.

FIG. 11B shows an example screen displayed by the web application 322 of the communication device of user B after the intervention button 1101 is pushed down. A box 1102 is a box for a user subject to motivation improvement. An intervention degree 1103 indicates the degree of intervention to improve the motivation. In the example shown in FIG. 11B, user B can intervene in user A up to the achievement rate of user B. That is, in FIG. 11B, the intervention degree can be set at a value in the range of 0 to 60 (that is the achievement rate of user B).

Then the web application 322 accepts the input of user A and an intervention degree of 60. The input is operation which can be accepted if the achievement rate of user A is lower than that of user B, so that the web application 322 reduces the contribution rate of user B by the intervention degree and increases the contribution rate of user A.

The server 100 of the present embodiment changes the contribution rate of each user according to the intervention degree inputted to the communication device. In the example shown in FIG. 11B, user B intervenes in user A with an intervention degree of 60%. In this case, the calculating unit 532 of the server 100 calculates the total of user A's previous contribution rate of 0.6 and user B's contribution rate of 0.4 multiplied by the intervention degree of 60% (0.6+0.4×0.6=0.84) as a new contribution rate of user A. Then the registration unit 531 updates the group information storage unit 511 with information as shown in FIG. 12B.

FIG. 11C shows an example screen displayed on the communication devices of user A and user B after intervention of user B. As shown in FIG. 11C, bee icons 1104 indicating the occurrence of intervention are displayed together with an image having the number of petals reduced.

As such, in FIG. 11C, the web application 322 displays image data of a flower that is a combination of petals based on the contribution rate of user B less than that of user B in FIG. 11A and petals based on the contribution rate of user A greater than that of user A in FIG. 11A. In the example shown in FIG. 11C, because the contribution rate of a user having a higher achievement rate becomes lower, the number of petals is decreased as compared with FIG. 11A. Although in the example shown in FIG. 11C petals based on the contribution rate of user A are not produced because the achievement rate of user A is 0%, if the achievement rate is greater than 0%, petals are produced.

Thus, it visually seems that the difference between user A and user B has become smaller, and thus a decrease in the motivation of user A can be suppressed. Further, because the contribution rate of user A improves, the ratio of an increase in the number of petals to an increase in the achievement rate improves. Thus, user A can actually feel more of the degree of target achievement, so that the motivation can be improved.

Where a family forms a group, one can think of the case where the flower, represented by image data which the server 100 has transmitted to the communication devices of the family, is just close to full bloom. In this case, suppose that, because the achievement rate of the father has not reached the target, the flower is forever not in full bloom. In this case, a plurality of persons in the group, for example, the mother and children can intervene in the father to a degree according to their achievement rate (e.g., having bees fly in the present embodiment).

Thus, the father's rate of contribution to the family becomes larger. Therefore, a sense of responsibility for family target achievement can be made to occur to the father. Further, as the contribution rate increases, the number of petals produced by the same amount of activity increases, and hence he can feel more of the achievement rate.

Next, the process of intervening in another user in the processing system of the present embodiment will be described. FIG. 13 is a sequence diagram showing the procedure of intervening in another user in the communication device of the embodiment.

First, the coordination application 323 of the first communication device 151 accepts the intervention through the intervention button displayed by the web application 322 being pushed down (S1301). Then the coordination application 323 calculates the maximum value of the degree of intervention (S1302). Although the present embodiment describes an example where the achievement rate is the maximum value of the degree of intervention, the maximum value of the degree of intervention may be obtained using another method.

Then the communication control unit 321 of the first communication device 151 transmits a request to transmit information about users in the group to the server 100 according to an command from the web application 322 (S1303).

The server 100 refers to the group information storage unit 511 and transmits user identification information of the group to the first communication device 151 of the first user (S1304).

Although the flow chart describes an example where, after performing operation of deciding to intervene in another user, a user specifies the degree to which to intervene in the other user within a range up to the maximum value, the invention is not limited to this method. For example, the server 100 may periodically transmit information about the degree to which to intervene in another user in the same group and the like to the communication device of a user (e.g., the first communication device 151). Thus, the intervention information in another user and the like (e.g., another user whose record has not been updated recently and the degree of intervention) is periodically displayed on the communication device (e.g., the first communication device 151). Then the user can intervene in the other user based on the intervention information and the like transmitted from the server 100, in other words, change the contribution rate of the other user or so on.

Then the web application 322 of the first communication device 151 displays the user information received at S1304 and the maximum value of the degree of intervention calculated at S1302 (S1305).

Then the web application 322 of the first communication device 151 accepts the input of a user to be intervened in and the input of the degree of intervention within a range up to the maximum value via a user interface (S1306).

Then the communication control unit 321 of the first communication device 151 notifies identification information of the user to be intervened in and the degree of intervention, together with a request to intervene to change the contribution rate, to the server 100 according to the web application 322 (S1307).

As such, if the target achievement rate of the user to be intervened in is lower than the target achievement rate of the user of the first communication device 151, the communication control unit 521 of the server 100 receives a request to intervene to change the contribution rate of the users in the same group.

Then the calculating unit 532 of the server 100 changes the contribution rate of the user based on the degree of intervention notified (S1308). Note that, not being limited to the above method, the method of changing the contribution rate need only be a method which increases the contribution rate of the user intervened in while decreasing the degree of target achievement of the entire group (in the case of flower image data, decreasing the number of petals).

Then the registration unit 531 updates the group information storage unit 511 with the changed contribution rates (S1309). Thus, the group information storage unit 511 updates the re-calculated contribution rate of both the user intervened in and the user of the first communication device 151.

Then the image generation unit 533 of the server 100 refers to the updated group information in storage unit 511 to generate image data to display. The image data is based on the achievement rates based on the changed contribution rates (S1310).

Then the communication control unit 521 of the server 100 transmits the generated image data to the communication devices of the users in the group (S1311, S1312).

The transmitted image data is decreased in the number of petals as compared with the image data before the request to intervene, when petals calculated for each user are combined based on the achievement rates and the contribution rates changed according to the request. In addition, bee icons indicating the occurrence of the request to intervene are also displayed.

Although the example where a bee image indicating the request to intervene is described, the image is not limited to a bee image. For example, with an image of rain or the like displayed in the background, petals of which the number decreases according to the weather may be displayed. Although the present embodiment describes the example where the degree of target achievement is indicated by the number of petals, another thing than the number of petals and the corresponding intervene request can also be made different.

Thus, the web application 322 of the first communication device 151 and the web application 322 of the second communication device 152 display image data indicating the occurrence of intervention (S1313, S1314).

Figure 14:
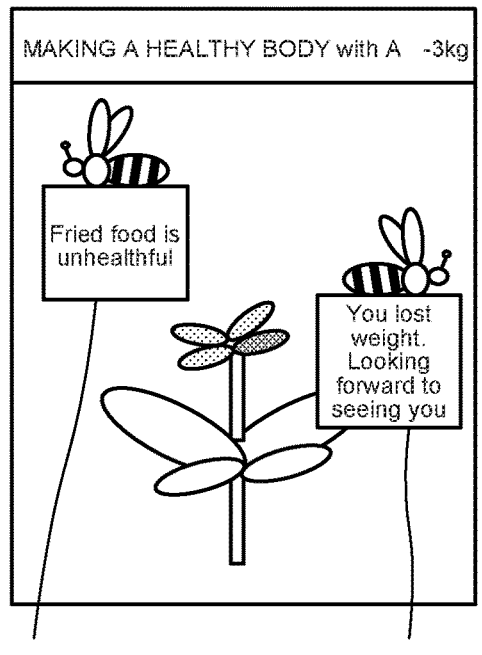
FIG. 14 is a figure showing an example display of messages transmitted/received between communication devices of the first embodiment.

In the processing system of the present embodiment, messages can be transmitted/received between the communication devices. FIG. 14 is a figure showing an example display of messages transmitted/received between the communication devices of the embodiment. FIG. 14 is an example screen displayed by the web applications 322 of the first and second communication devices 151, 152. FIG. 14 illustrates communication performed between the first and second communication devices 151, 152.

When user A enters a message to user B using a user interface displayed by the web application 322 of the first communication device 151, the communication control unit 321 transmits that message to the server 100.

Likewise, when user B enters a message to user A using a user interface displayed by the web application 322 of the second communication device 152, the communication control unit 321 transmits that message to the server 100.

The server 100 generates image data from the received message including a message 1401 from user B to user A and a message 1402 from user A to user B and transmits to the first and second communication devices 151, 152.

Figure 15:
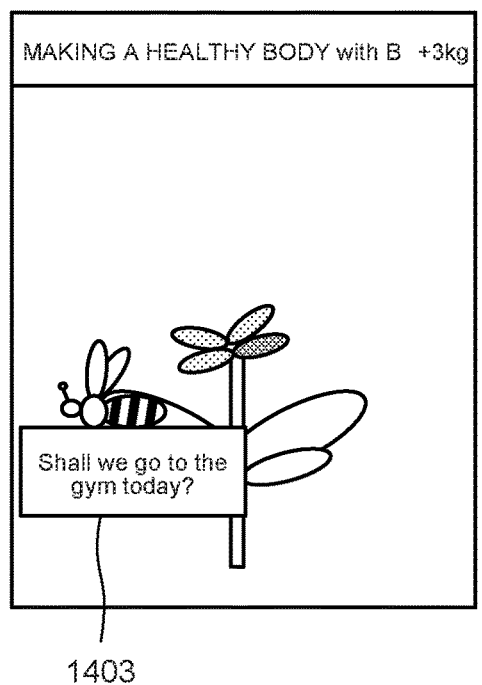
FIG. 15 is a figure showing an example display of a message transmitted from the server to the communication device of the first embodiment.

FIG. 15 is a figure showing an example display of a message transmitted from the server of the embodiment to a communication device. In the example shown in FIG. 15, the server 100 refers to the updated group information storage unit 511 to generate image data including a message for each user and transmits to a communication device (e.g., the second communication device 152). Then the second communication device 152 displays the received image data. Thus, user B can refer to a message according to the current position of user B.

As such, in the processing system of the present embodiment, by transmitting/receiving messages between users, the motivation to achieve a target can be improved.

Or the server 100 may refer to the updated group information storage unit 511 to transmit a message appropriate to each user. For example, the communication control unit 521 of the server 100 may transmit a message to the devices to encourage a user to update current positions or so on, of whom the frequency of updating the achievement rate is decreasing.

Although the present embodiment has described the example where each user in a group sets a target, a target may be set for the entire group. The method of inputting a target of a group or user can be one which accepts the input of a numerical value via a user interface of the communication device, and another method may be used in which the server 100 acquires activity data of a user and proposes a target appropriate to the user.

In the present embodiment, for users or the entire group, targets can be set according to the difference in ability between users and the difference in degree of difficulty. Activity data of each user may be automatically inputted from various sensors and wearable devices or manually inputted by the user to the communication device.

Second Embodiment

In the first embodiment, various processes performed to achieve targets in one group have been described. However, not being limited to users in one group, users may belong to a plurality of groups. Accordingly, in the second embodiment, processes where users belong to a plurality of groups will be described.

The present embodiment is the same in configuration as the first embodiment except that the server 100 further comprises a management storage unit in the storage unit 502.

FIG. 16 is a diagram illustrating the table structure of the management storage unit. As shown in FIG. 16, the management storage unit stores, for each group, the degree of group hardship and the achievement rate of each user associated with each other. In the example shown in FIG. 16, user A has an achievement rate of 90% in a group 1 while having an achievement rate of 2% in a group 3. The processing system of the present embodiment provides a function with which, when a user F in the group 3 intervenes in user A of the group 3, user F also intervenes in user A of the group 1.

The interface used to intervene is almost the same as in the first embodiment. For example, when user F intervenes in user A of the same group, user F enters the designation of user A, the degree of intervention, and the designation of the group to which user A belongs.

Then the communication device of user F transmits user identification information of user A, the degree of intervention, and the group to intervene in to the server 100. Then the calculating unit 532 of the server 100 changes the contribution rates of user A and user F of the group 3 according to the degree of intervention received. Further, the calculating unit 532 of the server 100 changes the contribution rates of the group 1. The method of changing the contribution rates of the group 3 is the same as in the first embodiment, and description thereof is omitted.

In user F intervening in user A of the group 1, the communication device of the embodiment accepts the input which is the degree of intervention based on the achievement rate of 50% of user F of the group 3 and the achievement rate of 2% of user A of the group 3. Thus, the larger achievement rate of user F and smaller achievement rate of user A in the group 3 cause the degree of intervention in the group 1 to be larger.

In the present embodiment, the degree of intervention in the group 1 is calculated as $(100\%-2\%) \times 50\% = 49\%$, where 2% is the achievement rate of user A and 50% is that of user F. The calculating unit 532 of the server 100 increases/decreases the contribution rate of user A of the group 1 according to the degree of intervention in the group 1.

For example, the calculating unit 532 increases the contribution rate of user A of the group 1 by 49% and correspondingly decreases those of other users B, C of the group 1. Then the image generation unit 533 of the server 100 generates image data based on the changed contribution rates. As in the first embodiment, an image of a flower based on the changed contribution rates, together with bee icons indicating the intervention, is displayed on the communication devices of the users of the group 1. Thus, user A realizes the occurrence of intervention, and since the achievement rate in the group 1 is already high, user A will start making efforts to achieve the target in the group 3.

In another example, the calculating unit 532 may decrease the contribution rate of user A of the group 1 by 49% and correspondingly increase those of other users B, C of the group 1. Thus, since the user A's achievement rate in the group 1 is less reflected in the number of petals, user A will start making efforts to achieve the target of the group 3. As such, the reference for motivation improvement is different for each user. In the present embodiment, any method may be used as long as the contribution rate can be increased/decreased to improve the motivation of each user.

In the above embodiment, intervention in a user who has not produced a result causes the number of petals to decrease. Thus, the sense of responsibility for progress can be improved. Further, by adjusting the contribution rate, even with the same amount of activity, the amount of change in image data (e.g., the number of petals) can be increased as compared with the contribution rate before the adjustment. Thus, the user's sense of achievement is increased. Therefore, the motivation of the user can be improved.

As such, in the above embodiment, the motivation for target achievement of each user in groups can be maintained.

Further, because the target of a group is not achieved as long as all the users in the group have not achieved targets, the users in the group can improve the motivation of each other. Yet further, the contribution rate is set according to an objective of each user in a group. Therefore, the achievement rate of each user can be displayed considering the degree of difficulty or the like of their objective, so that their motivation can be maintained.

Further, the processing system of the above embodiment comprises the above configuration, and thus the target achievement of the users in a group can be managed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processing system comprising a server that is connectable via a network to a first communication device used by a first user included in a first group and that is connectable via the network to a second communication device used by a second user included in the first group, wherein the server comprises:
a receiver configured to receive first situation information from the first communication device and second situation information from the second communication device, the first situation information indicating a first degree of progress of the first user, the second situation information indicating a second degree of progress of the second user;
a controller configured (i) to calculate a first contribution rate and a second contribution rate so that a group rate obtained by adding the first contribution rate and the second contribution rate substantially equals a certain value, the first contribution rate indicating a rate of contributing to an achievement of a group target in a case where the first user has achieved a first target related to the first user, the second rate indicating a rate of contributing to the achievement of the group target in a case where the second user has achieved a second target related to the second user, the group rate indicating a rate of an achievement of the group target in a case where each group member has achieved their target, and (ii) to generate display information including a first degree of achievement of the first target and a second degree of achievement of the second target, the first degree of achievement indicating the achievement of the group target by the first user, the first degree of achievement being obtained by multiplying the first degree of progress with the first contribution rate, and the second degree of achievement indicating the achievement of the group target by the second user, the second degree of achievement being obtained by multiplying the second degree of progress with the second contribution rate; and
a transmitter configured to transmit the generated display information to the first communication device and the second communication device in parallel,
wherein:
when the first communication device displays the display information and an intervention button object on a screen, and the first communication device detects a pushing-down operation of the intervention button object to transmit an intervention request, the receiver receives the intervention request via the network from the first communication device,
in response to the received intervention request, the controller is configured to re-calculate the first contribution rate and the second contribution rate so that the second contribution rate is increased and the first contribution rate is decreased and the group rate obtained by adding the decreased first contribution rate and the increased second contribution rate substantially equals the certain value, and re-generate the display information by multiplying the first degree of progress with the decreased first contribution rate and multiplying the second degree of progress with the increased second contribution rate, and
the transmitter is configured to transmit the re-generated display information to the first communication device and the second communication device in parallel.

2. The processing system according to claim 1, wherein the server further comprises a memory configured to store, for a group, a rate of a user in the group,
wherein the receiver receives from a third communication device of a third user of one group a request to change rates indicating an achievement rate of another group in a case where a fourth user in the another group has achieved a fourth target, and
wherein the transmitter transmits, to devices of users in the another group, display information of the another group indicating degrees of achievement based on the rates changed according to the request.

3. The processing system according to claim 1,
wherein the receiver is further configured to receive a request to create a first group, which request includes second user identification information to identify the second user, from the first communication device, and
wherein the transmitter is further configured to transmit an invitation to join the first group to the second communication device that is identified by the second user identification information included in the request to create.

4. The processing system according to claim 1,
wherein the receiver is further configured to receive first target information indicating the first target from the first communication device and second target information indicating the second target from the second communication device,
wherein the server further comprises a memory configured to store the first target information received by the receiver, and the second target information received by the receiver, and
wherein the controller calculates the first rate based on a degree of difficulty of the first target, and calculates the second rate based on a degree of difficulty of the second target.

5. The processing system according to claim 4, wherein the receiver further receives the degree of difficulty of the first target from the first communication device and the degree of difficulty of the second target from the second communication device.

6. A first communication device that is used by a first user included in a first group, and that is connectable via a network to a server, the server being connectable via the network to the first communication device and to a second communication device used by a second user included in the first group, wherein the server is configured (i) to calculate a first contribution rate and a second contribution rate so that a group rate obtained by adding the first contribution rate and the second contribution rate substantially equals a certain value, the first contribution rate indicating a rate of contributing to an achievement of a group target in a case where the first user has achieved a first target related to the first user, the second rate indicating a rate of contributing to the achievement of the group target in a case where the second user has achieved a second target related to the second user, the group rate indicating a rate of an achievement of the group target in a case where each group member has achieved their target, and (ii) to generate display information including a first degree of achievement of the first target and a second degree of achievement of the second target, the first degree of achievement indicating the achievement of the group target by the first user, the first degree of achievement being obtained by multiplying a first degree of progress with the first contribution rate, and the second degree of achievement indicating the achievement of the group target by the second user, the second degree of achievement being obtained by multiplying a second degree of progress with the second contribution rate, and (iii) to transmit the generated display information to the first communication device and the second communication device in parallel, the first communication device comprising:

a receiver configured to receive the generated display information via the network from the server;

a display configured to display the received display information and an intervention button object on a screen;

a controller configured to create an intervention request in response to detecting a pushing-down operation of the intervention button object; and a transmitter configured to transmit the created intervention request to the server;

wherein:

the server is configured to receive the intervention request via the network from the first communication device, in response to the received intervention request, the server is configured to re-calculate the first contribution rate and the second contribution rate so that the second contribution rate is increased and the first contribution rate is decreased and the group rate obtained by adding the decreased first contribution rate and the increased second contribution rate substantially equals the certain value, and re-generate the display information by multiplying the first degree of progress with the decreased first contribution rate and multiplying the second degree of progress with the increased second contribution rate, the server is configured to transmit the re-generated display information to the first communication device and the second communication device in parallel, the receiver is configured to receive the re-generated display information via the network from the server, and the display is configured to display the re-generated display information on the screen.

7. The first communication device according to claim 6, further comprising:

a second receiver configured to receive, from a detector worn by the first user, activity information about the first user wearing the detector; and wherein the transmitter is configured to transmit, when first activity information received by the receiver is closer to the first target than second activity information, the first activity information to a server, the second activity information being received by the second receiver before the first activity information and transmitted to the server.

8. The first communication device according to claim 6, wherein the transmitter is configured to transmit a request to create the first group to the server.

9. The first communication device according to claim 8, wherein the controller is configured to accept selection of the second user to be invited to join the first group, and wherein the request to create the first group, transmitted by the transmitter, includes second user identification information to identify the second user.

10. The first communication device according to claim 8, wherein the controller is configured to accept input of first target information indicating the first target related to the first user, and wherein the transmitter is configured to transmit the first target information to the server.

11. The first communication device according to claim 10, wherein the controller is configured to accept input of a degree of difficulty of the first target indicated by the first target information, and wherein the transmitter is configured to transmit the degree of difficulty of the first target indicated by the first target information to the server.

12. The first communication device according to claim 6, wherein:

the receiver is configured to receive an invitation to join the first group from the server; and the transmitter is configured to transmit information which indicates joining the first group to the server.

13. A first communication device that is used by a first user and that is connectable via a network to a server, wherein the server is configured (i) to receive first situation information from the first communication device and second situation information from a second communication device, the first situation information indicating a first degree of progress of the first user, the second situation information indicating a second degree of progress of the a second user, (ii) to calculate a first contribution rate and a second contribution rate so that a group rate obtained by adding the first contribution rate and the second contribution rate substantially equals a certain value, the first contribution rate indicating a rate of contributing to an achievement of a group target in a case where the first user has achieved a first target related to the first user, the second rate indicating a rate of contributing to the achievement of the group target in a case where the second user has achieved a second target related to the second user, the group rate indicating a rate of an achievement of the group target in a case where each group member has achieved their target, and configured to generate display information including a first degree of achievement of the first target and a second degree of achievement of the second target, the first degree of achievement indicating the achievement of the group target by the first user, the first degree of achievement being obtained by multiplying the first degree of progress with the first contribution rate, and the second degree of achievement indicating the achievement of the group target by the second user, the second degree of achievement being obtained by multiplying the second degree of progress with the second contribution rate, and (iii) transmit the generated display information to the first communication device and the second communication device in parallel, the first communication device comprising:

a first receiver configured to receive, from a detector worn by the first user, activity information about the first user wearing the detector;

a controller configured to generate the first situation information, based on the received activity information;

a transmitter configured to transmit the first situation information via the network to the server;

a second receiver configured to receive the generated display information via the network from the server; and a display configured to display the received display information and an intervention button object on a screen;

wherein:

the controller is configured to create an intervention request in response to detecting a pushing-down operation of the intervention button object, the transmitter is configured to transmit the created intervention request to the server, the server is configured to receive the intervention request via the network from the first communication device, in response to the received intervention request, the server is configured to re-calculate the first contribution rate and the second contribution rate so that the second contribution rate is increased and the first contribution rate is decreased and the group rate obtained by adding the decreased first contribution rate and the increased second contribution rate substantially equals the certain value, and re-generate the display information by multiplying the first degree of progress with the decreased first contribution rate and multiplying the second degree of progress with the increased second contribution rate, the server is configured to transmit the re-generated display information to the first communication device and the second communication device in parallel, the second receiver is configured to receive the re-generated display information via the network from the server, and the display is configured to display the re-generated display information on the screen.

14. The first communication device according to claim 13, wherein the transmitter is configured to transmit, in a case where first activity information received by the first receiver is closer to the first target than second activity information, the first activity information to the server, the second activity information being received by the first receiver before the first activity information and transmitted to the server.

15. The first communication device according to claim 13, wherein the transmitter is configured to transmit a request to create the first group to the server.

16. The first communication device according to claim 15, wherein the controller is configured to accept selection of the second user to be invited to join the first group, wherein the request to create the first group, transmitted by the transmitter, includes second user identification information to identify the second user.

17. The first communication device according to claim 15, wherein the controller is configured to accept input of first target information indicating the first target related to the first user, and wherein the transmitter transmits the first target information to the server.

18. The first communication device according to claim 17, wherein the controller is configured to accept input of the degree of difficulty of the target indicated by the first target information, and wherein the transmitter is configured to transmit the degree of difficulty of the target indicated by the first target information to the server.

19. The first communication device according to claim 13, wherein:

the second receiver is configured to receive an invitation to join the first group from a server; and the transmitter is configured to transmit information which indicates joining the first group to the server.

* * * * *